No. 648,490. Patented May 1, 1900.
F. W. H. GRAEFF & J. F. GEISLER.
PROCESS OF MAKING MILK SUGAR.
(Application filed July 28, 1898.)
(No Model.)
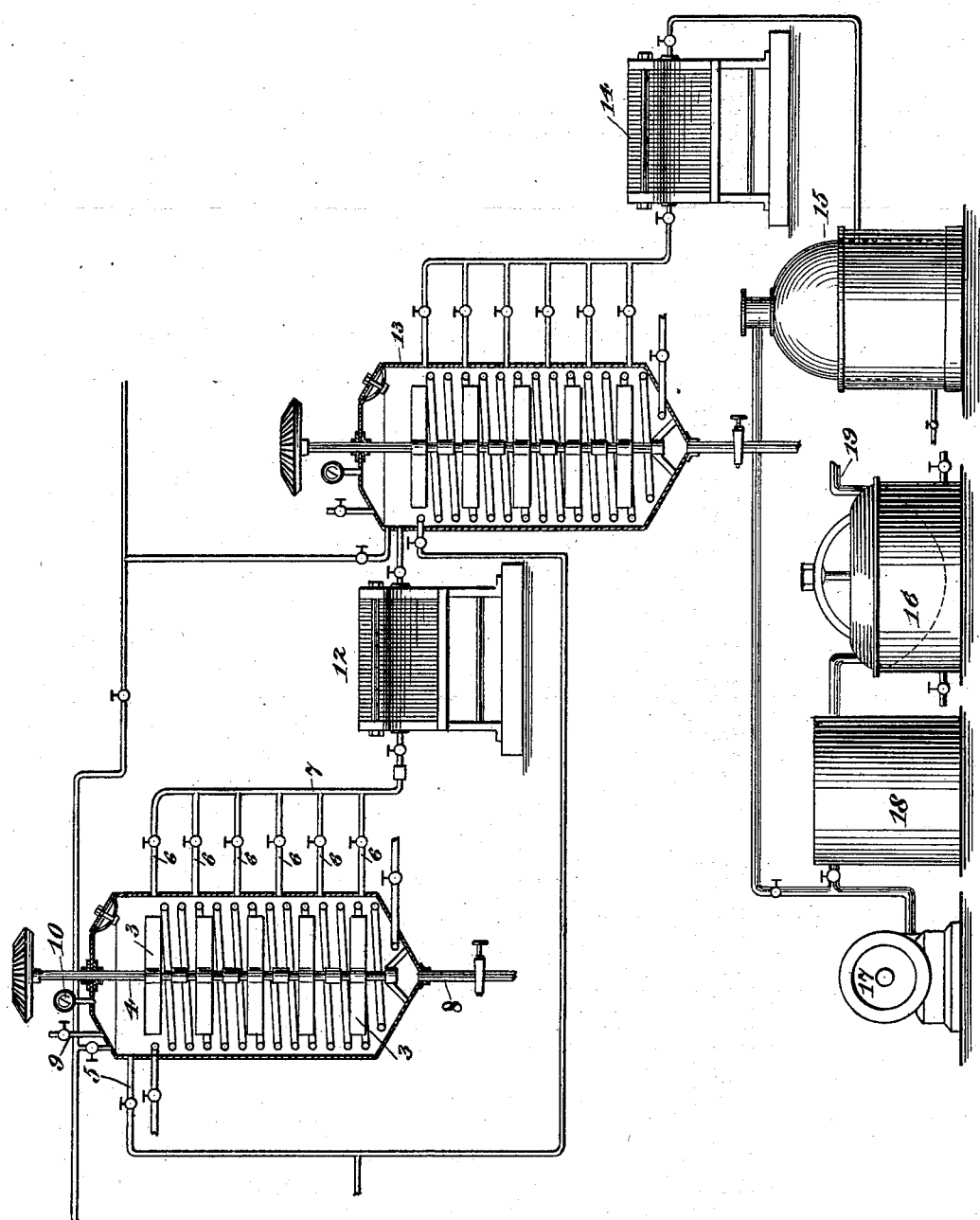
WITNESSES:
INVENTORS
BY
ATTORNEYS

UNITED STATES PATENT OFFICE.

FRIEDRICH WILHELM HERMANN GRAEFF, OF RUTHERFORD, NEW JERSEY, AND JOSEPH F. GEISLER, OF NEW YORK, N. Y.

PROCESS OF MAKING MILK-SUGAR.

SPECIFICATION forming part of Letters Patent No. 648,490, dated May 1, 1900.

Application filed July 28, 1898. Serial No. 687,098. (No specimens.)

*To all whom it may concern:*

Be it known that we, FRIEDRICH WILHELM HERMANN GRAEFF, a citizen of Germany, residing at Rutherford, New Jersey, and JOSEPH FRANK GEISLER, a citizen of the United States, residing at No. 1014 Trinity avenue, New York city, in the State of New York, have invented certain new and useful Improvements in Methods for the Manufacture of Milk-Sugar from Whey or Milk; and we do hereby declare the following to be a full, clear, and exact description of the invention, such as will enable others skilled in the art to which it appertains to make and use the same.

Our invention relates to improvements in processes for the extraction of milk-sugar from milk and whey; and it consists in employing pressure derived from an external source in coagulating the albumen contained in the milk and in crystallizing the sugar while the fluid is maintained at a comparatively low temperature.

The objects of our invention are to coagulate albumen contained in the milk and whey in an efficient and economical manner, avoiding repeated rehandling and refiltration of the solution and coagulating the albumen in such form that it may not clog the filter and to avoid loss of sugar through the action of bacteria.

In the extraction of milk-sugar it is customary to remove the casein by means of rennet or acid, or both, and then to heat the remaining fluid, termed "whey," to the boiling-point for the purpose of coagulating the albumen, acid or coagulative agents being added, if necessary, to facilitate the coagulation of the albumen. The albumen so coagulated is then separated from the fluid by filtration, and the fluid is concentrated and the milk-sugar separated therefrom by crystallization; but much difficulty has been experienced in the past in the coagulating of the albumen and removal of the same from the fluid by filtration owing to the fact that the methods heretofore used for coagulating the albumen cause the same to coagulate in a finely-divided and slimy condition, which renders filtration difficult and slow, the pores of the filtering medium becoming choked and clogged with the albumen deposited. Moreover, it has been found that the methods heretofore employed for the coagulation of albumen frequently fail to cause complete coagulation upon the first treatment, and it frequently happens that after the solution has been treated for the coagulation of the albumen and filtered further application of heat to concentrate the fluid causes further coagulation of albumen, thus necessitating further filtration, and it sometimes becomes necessary to filter the solution a number of times for this reason.

In the extraction of milk-sugar by the processes heretofore employed considerable loss of sugar results from the action of lactic-acid bacteria during the crystallization, these bacteria converting much of the milk-sugar into lactic acid when the fluid is heated to the temperature to which it is usually heated during the crystallization. The action of lactic-acid bacteria may not be prevented simply by sterilizing the fluid. The fluid must be kept sterile at all times, or the crystallization must be conducted at a temperature at which the lactic-acid bacteria are inactive. The difficulty first mentioned we overcome by the method of coagulating the albumen and similar substances employed and which forms the subject-matter of a separate application for Letters Patent filed by us on July 12, 1898, Serial No. 685,742. By this method the albumen may be caused to coagulate in tough granular masses or clots, which are readily separated from the fluid by filtration. The second difficulty mentioned we overcome by crystallizing the sugar while the solution is maintained at a comparatively-low temperature—below 60 degrees Fahrenheit and preferably ranging from 32 to 40 degrees Fahrenheit—and by conducting the crystallization in a closed vessel and with the aid of vacuum, the solution being first sterilized by the application of heat; but we do not confine ourselves to crystallizing at these temperatures. We may also introduce an antiseptic substance into the crystallizing-chamber.

In the drawing which accompanies and forms a part of this specification we illustrate diagrammatically an apparatus which may be employed in the carrying out of the process.

1 is a suitable digester or heating vessel having within it a heating-coil 2 and preferably stirrers 3, mounted upon a shaft 4.

5 is a pipe through which the fluid to be treated may be admitted to the interior of the digester.

6 6 are a series of taps through which the fluid may be drawn off into a pipe 7, and 8 is a pipe through which sediment remaining in the digester may be drawn off.

9 is a blow-off pipe, 10 a pressure-gage, and 11 a pressure-pump by which air or gas pressure may be applied to the fluid within the digester.

12 is a filter through which the fluid drawn off through the pipe 7 is passed, which filter serves to remove the albumen and precipitate it in the digester 1.

13 is a second heating vessel, which may be similar to vessel 1, and 14 a second filter.

15 is a vacuum-pan for concentrating the solution.

16 is a crystallizing vessel, 17 a vacuum-pump, and 18 is a tank inserted between the crystallizing-chamber 16 and pump 17, which may contain a dehydrating compound.

The vacuum-pan 15 and the crystallizing-chamber 16 are provided with jackets, into which steam may be admitted for heating their contents. Into the jacket of the crystallizing vessel also cooling water may be introduced; but any other device for heating the pan 15 and vessel 16 and for cooling the latter may be used. The tank in which the milk is treated for the precipitation of the casein and the filter by which the casein is separated from the whey are not shown. The ordinary apparatus for this purpose may be used.

In carrying out our process after the casein has been removed from the milk in any suitable manner, as by the addition of rennet or acids, or both, and by filtering out the precipitated casein, acid or alkali, as may be necessary, is added to the resulting whey to bring the acidity of the solution to a strength varying from eight to sixteen cubic centimeter of $n/10$ sodium-hydrate solution per fifty cubic centimeters of whey. We do not confine ourselves to these limits of acidity, but consider it preferable that the acidity shall be within such limits. If in order to bring the acidity within the desired limits it is necessary to add an acid, it is preferable to employ acetic acid. The whey is then passed into the closed digester 1, and pressure is applied to it by means of compressed air or other convenient and suitable gas forced into the digester by the pump 11 or by any other suitable means. The initial pressure thus applied usually ranges from one to two atmospheres. The solution is then heated, and to insure rapid and uniform heating of the solution the stirrer 3 may be operated. The expansion of the air or gas which takes place as the temperature rises causes a gradual increase in pressure; but if such increase be not sufficiently rapid the pump 11 may be operated to raise the pressure still further, or the pressure may be raised in any other suitable manner. During the heating the pressure is always maintained sufficiently high to prevent evaporation of the fluid during the heating. The solution is usually heated to a temperature of from 100° to 125° centigrade. A higher temperature is not used because of the probability that discoloration of the whey may result if a temperature of 125° centigrade be exceeded. When the desired temperature is reached, the pressure will have risen to between three and four atmospheres. After this temperature and pressure have been maintained for a time the pressure is relieved by opening the escape-valve 9 in the digester and is allowed to fall until the boiling-point of the fluid is reached and steam has begun to escape. The valve 9 is then closed and this temperature and pressure maintained for a time, so as to enable the albumen to coagulate as completely as possible and settle. When the coagulating and settling have been accomplished, the fluid may be allowed to cool slowly, or the escape-valve 9 may be opened and the escaping steam caused to blow into a second digester charged with whey for the double purpose of heating the fluid in the second digester and of cooling the fluid in the first digester. If desired, the pressure may not be held for a time at the boiling-point of the whey, as above described, but may be allowed to fall to atmospheric pressure in one step; but we prefer to hold the pressure for a time at the boiling-point, as above described. This treatment above described results in the coagulation and precipitation of the greater portion of the albumen in granular masses and frequently in lumps of a tough leathery character, which may be separated readily from the fluid by filtration, siphoning, or decantation. The liquid is then drawn off through the pipes 6 into the pipe 7, being drawn off gradually and from the top, so as to avoid disturbing the albumen which has settled to the bottom of the digester 1. It is then pressed through the filter 12, by which the coagulated albumen in mechanical suspension in the fluid is removed therefrom, and flows into a second digester 13, or the filter 12 between digesters 1 and 13 may be omitted, since when sufficient time is allowed for the settling of the albumen within the digester 1 the supernatant liquid may be drawn off practically clear. If preferred, the separation of the precipitated albumen from the fluid by decantation, siphoning, or filtration may be omitted and the treatment next to be described as taking place in digester 13 may take place in the digester 1 instead. In the treatment of many wheys, however, it is found better to remove the albumen coagulated by the first treatment before the fluid is neutralized, as next described. The fluid within the digester 13 is then almost neutralized by the addition of a solution of sodium hydrate, sodium carbonate, or other suitable alkali to coagulate the small amount of albumen soluble in acid solutions still remaining in the fluid, and, if desired, the fluid may be heated to the boiling-point to assist this coagulation. The fluid is then filtered by drawing it off and passing it through the filter 14. It is then free from albumen and may be concentrated for the crystallization of the milk-sugar in the vacuum-pan 15.

If the whey was separated from the casein by the use of sulphuric acid, as is frequently the case, a solution of a soluble barium salt should be added to the whey either before or after the treatment for the coagulation of the albumen in sufficient quantity to precipitate the sulphuric acid as insoluble barium sulphate. If alum is used as the chemical coagulative agent for coagulating the albumen, however, the barium salt may be added with the alum.

If skim-milk is used as the source of the milk-sugar, the casein and albumen may be precipitated together, although in general it is better because of the commercial value of the casein to separate and remove it before precipitating the albumen.

When it is desired to remove the sugar from the concentrated solution, said solution is sterilized by heating it to a temperature exceeding 100° centigrade under a superpressure of one or more atmospheres of air or other suitable gas, and is then transferred to one or more crystallizing vessels 16, or the solution may be run direct from the vacuum-pans in which it is concentrated through sterilized pipes into the crystallizing-chamber 16. This crystallizing-chamber is a closed jacketed kettle connected with the vacuum-pump 17 and dehydrating-chamber 18. The crystallizing-chamber should be sterilized by means of a suitable sterilizing agent, such as formaldehyde, before the sugar-syrup is passed into it. Steam or other source of heat is then admitted into the jacket of the crystallizing-chamber to concentrate the solution still further, the evaporation being conducted under vacuum produced by the operation of the pump 17, if desired, until the solution has been concentrated to the point where it will crystallize. Admission of steam to the jacket is then stopped, and a cooling fluid, such as water, may be admitted thereto to lower the temperature of the sugar solution to a point below that at which bacteria act upon it. We prefer to maintain a temperature of from 32° to 40° Fahrenheit during the crystallization, but do not limit ourselves to such temperature. During the crystallization a vacuum is maintained in the crystallizing-chamber and moisture drawn off by the suction is absorbed by a dehydrating agent, such as calcium chloride or sulphuric acid in the chamber 18.

If desired, an antiseptic solution or gas, such as formaldehyde, may be introduced into the space above the sugar solution through a pipe 19 during crystallization to prevent the action of bacteria upon the sugar; but in general if the sterilization of the chambers and passages and of the sugar solution has been properly conducted and if the temperature of the crystallizing-chambers be maintained sufficiently low the introduction of a sterilizing agent is not necessary.

Having thus completely described our invention, what we claim, and desire to secure by Letters Patent, is—

1. The herein-described process of extracting milk-sugar from whey, which consists in coagulating the albuminous matters by heating the whey and applying pressure thereto from an external source, removing the albumen, and extracting the sugar from the resulting fluid, substantially as described.

2. The herein-described process of extracting milk-sugar from whey, which consists in heating the whey and applying pressure from an external source, the pressure being maintained sufficiently high to prevent evaporation of the fluid, then reducing the pressure until the boiling-point of the fluid is reached, and then separating the coagulated albumen from the fluid and extracting the sugar from the fluid, substantially as described.

3. The herein-described process of extracting milk-sugar from whey, which consists in heating an acidulated solution of whey and applying pressure thereto from an external source, reducing the acidity of the remaining solution, and reheating the same, extracting the coagulated albumen, and then extracting the sugar from the fluid, substantially as described.

4. The herein-described process of extracting milk-sugar from whey, which consists in heating the whey and applying pressure thereto from an external source, removing the coagulated albumen, reducing the acidity of the solution and again heating the same, and separating the coagulated albumen, and then extracting the sugar from the remaining solution, substantially as described.

5. The herein-described process of extracting milk-sugar from whey, which consists in removing the albumen from the whey, concentrating the remaining solution, and crystallizing the sugar therefrom while the fluid is maintained at a temperature lower than that at which the action of bacteria upon the solution may take place, substantially as described.

In testimony whereof we affix our signatures in presence of witnesses.

FRIEDRICH WILHELM HERMANN GRAEFF.
 JOSEPH F. GEISLER.

Witnesses:
 F. G. HENRY,
 W. H. HEALY,
 JOS. A. KARL.